United States Patent [19]
Kaneko et al.

[11] Patent Number: 6,134,030
[45] Date of Patent: *Oct. 17, 2000

[54] IMAGE READING APPARATUS AND IMAGE READING UNIT AND CONTROL APPARATUS

[75] Inventors: Kiyoshi Kaneko; Akihiko Nakatani, both of Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/861,580

[22] Filed: May 22, 1997

[30] Foreign Application Priority Data

May 24, 1996 [JP] Japan .................................... 8-129903

[51] Int. Cl.$^7$ ...................................................... H04N 1/46
[52] U.S. Cl. ............................................................ 358/505
[58] Field of Search ..................................... 358/505, 474, 358/518, 523, 461; 382/167, 274

[56] References Cited

U.S. PATENT DOCUMENTS

| | | |
|---|---|---|
| 4,092,668 | 5/1978 | Knop .......................................... 358/80 |
| 4,750,050 | 6/1988 | Belmares-Sarabia .................... 358/311 |
| 4,949,391 | 8/1990 | Faulkerson et al. ..................... 382/313 |
| 5,237,401 | 8/1993 | Koike et al. ............................. 358/518 |
| 5,276,459 | 1/1994 | Danzuka et al. ......................... 358/518 |
| 5,327,258 | 7/1994 | Ueda ........................................ 358/461 |
| 5,455,690 | 10/1995 | Ishikawa ................................. 358/461 |
| 5,457,547 | 10/1995 | Yamada ................................... 358/487 |
| 5,489,998 | 2/1996 | Yamada et al. ......................... 358/518 |
| 5,500,745 | 3/1996 | Ishiba et al. ............................. 358/461 |
| 5,528,270 | 6/1996 | Tajika et al. .............................. 347/19 |
| 5,644,409 | 7/1997 | Irie et al. ................................. 358/461 |
| 5,696,840 | 12/1997 | Usami ..................................... 382/167 |

FOREIGN PATENT DOCUMENTS

0 594 447 4/1994 European Pat. Off. .
0 767 579 4/1997 European Pat. Off. .

*Primary Examiner*—Jerome Grant, II
*Attorney, Agent, or Firm*—Fitzpatrick, Cella, Harper & Scinto

[57] ABSTRACT

All of reference data are stored into a memory of a device main body and the reference data according to a condition at that time is written into a reference data memory built in an image processing IC of a scanner cartridge. By correcting an image signal by using the reference data, an image can be read at a high quality without increasing a memory capacity in the cartridge.

102 Claims, 8 Drawing Sheets

IMAGE READING APPARATUS AND IMAGE READING UNIT AND CONTROL APPARATUS

BACKGROUND OF THE INVENTION

1. Field of the Invention

The invention relates to an image reading system in which an image reading cartridge is detachable in relation to a control apparatus.

2. Related Background Art

Hitherto, a printer in which a recording cartridge such as ink jet head, thermal head, or the like is attached to a carriage and an image is recorded onto a recording paper by moving the carriage has been used as output equipment of a personal computer, a word processor, or the like.

Further, a method has been proposed whereby in place of the recording cartridge, an image reading cartridge having a photoelectric converting function is attached to the carriage of such a printer to be used as a scanner for reading an image of an original, the image data obtained by reading the original image being input to a personal computer, a word processor, or the like.

In association with the improvement of a processing ability of a personal computer, the spread of a color printer, or the like, even in case of reading an image, it is demanded to improve the function such that not only may the original image be read as a black and white binary image but also the original image may be read as a multivalue image including black and white and halftone density and color, the original image may be read at a variety of resolutions, or the like.

In order to cope with various modes or resolutions as mentioned above, however, not only must be capacity of the memory for showing the image read data be set to large enough capacity but also it is necessary to further store the data and various modes for processing the read image data in accordance with the resolution. Consequently, the required memory capacity further increases and the size, cost, and the like of the system increase.

SUMMARY OF THE INVENTION

It is an object of the invention to realize an image reading operation of a high quality.

Another object of the invention is to realize a miniaturization of a reading apparatus.

Still another object of the invention is to realize a reduction of costs of the reading apparatus.

To accomplish the above objects, according to an embodiment of the invention, an image reading cartridge comprises: reading means for reading an image and outputting a plurality of different color signals; and first storage means capable of storing at least one correction data to correct each of the color signals outputted from the reading means, wherein the image reading cartridge is detachably attached to a control apparatus having second storage means in which a plurality of correction data to correct each of the color signals have been stored and control means for controlling in a manner such that the correction data according to the color signal to be corrected is read out from the second storage means and is stored into the first storage means.

According to another embodiment of the invention, an image reading cartridge comprises: reading means for reading an image and outputting an image signal; and first storage means capable of storing at least one correction data to correct the image signal which is outputted from the reading means, wherein the image reading cartridge is detachably attached to a control apparatus having mode switching means for switching a reading mode by the reading means, second storage means in which a plurality of correction data corresponding to the reading mode to correct the image signal have been stored, and control means for controlling in a manner such that the correction data according to the reading mode which is switched by the mode switching means is read out from the second storage means and is stored into the first storage means.

According to further another embodiment of the invention, an image reading cartridge comprises: a plurality of light sources for irradiating an image of an original; reading means for reading the original image irradiated by the light sources and outputting an image signal; and first storage means capable of storing at least one correction data to correct the image signal outputted from the reading means, wherein the image reading cartridge is detachably attached to a control apparatus having second storage means in which a plurality of correction data to correct the image signal have been stored in accordance with the light sources and control means for controlling in a manner such that the correction data according to the light sources for irradiating the original image is read out from the second storage means and is stored into the first storage means.

With such a construction, the image can be read out at a high quality without increasing memory capacity on the image reading cartridge side. A size and costs of the whole system can be reduced.

The above and other objects and features of the present invention will become apparent from the following detailed description and the appended claims with reference to the accompanying drawings.

DETAILED DESCRIPTION OF THE PREFERRED EMBODIMENTS

Figure 1:
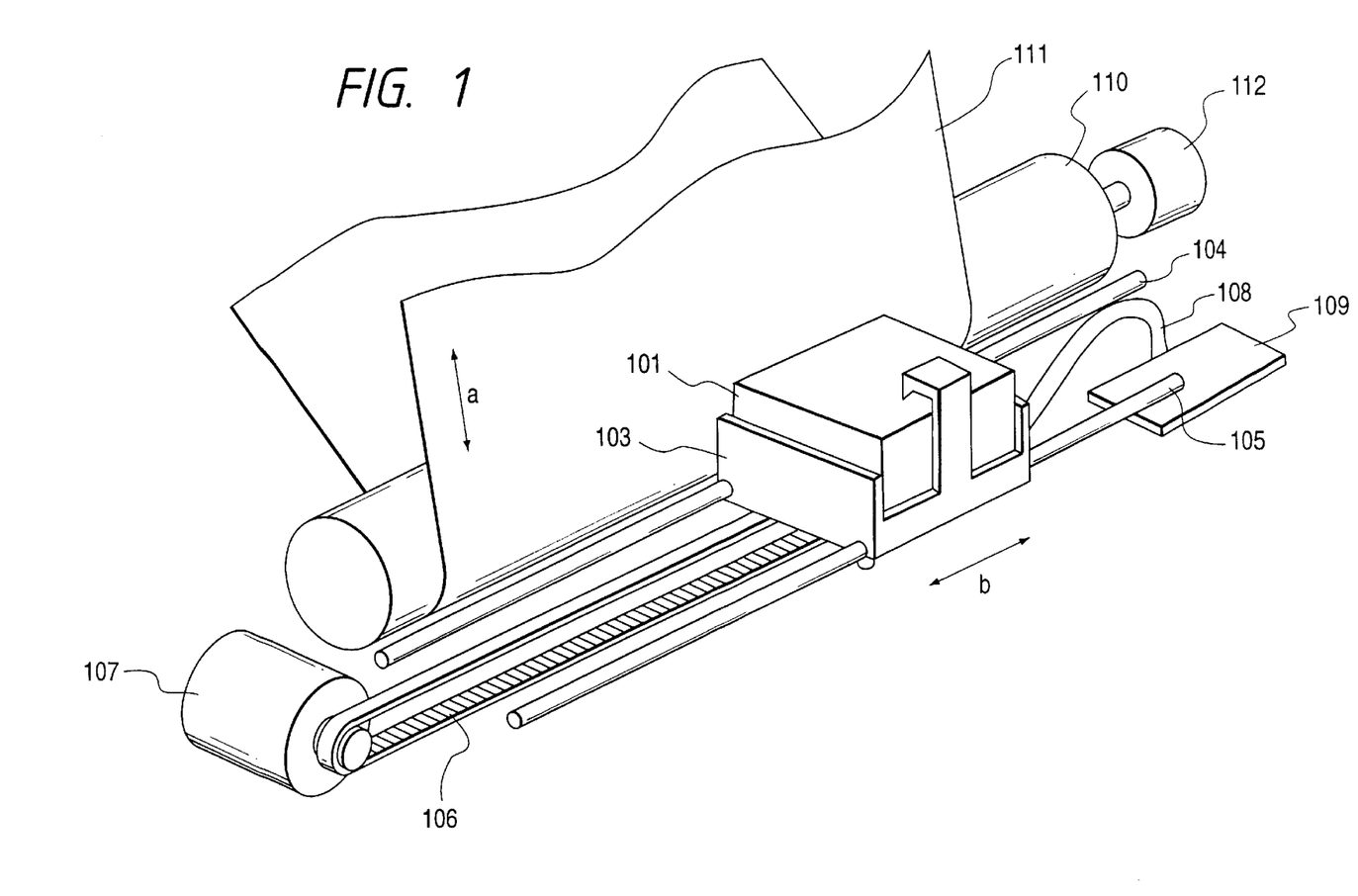
FIG. 1 is a constructional diagram of an image recording apparatus to which the invention is applied.

FIG. 1 is a diagram showing a construction of a main portion of an image recording/reading apparatus according to an embodiment of the invention. Reference numeral 101 denotes an ink jet head (recording cartridge) having 128 ink discharge ports. The recording cartridge 101 is detachable for a carriage 103. Reference numerals 104 and 105 denote guide axes for holding the carriage 103 so as to be movable in the axial direction. Reference numeral 106 denotes a belt for transferring a driving force of a carriage motor 107 to the carriage 103 in order to reciprocatingly move the carriage 103 in the direction shown by an arrow b along the guide axes 104 and 105. Reference numeral 108 denotes a flexible printed card (FPC) for electrically connecting the print head 101 and a control board 109. Reference numeral 110 denotes a paper feed roller which is rotated by a roller motor 112 and moves a recording paper 111 in the direction of an arrow a.

The recording operation of an image will now be described hereinbelow. The recording cartridge 101 has 128 ink discharge ports as mentioned above. When the carriage 103 is moved (going motion) once from the left to the right in the diagram, dots of up to 128 lines are recorded on the recording paper 111. After completion of the going motion of the carriage 103 of one time from the left to the right in the diagram, the paper feed roller 110 rotates, thereby feeding the recording paper 111 by a distance corresponding to a recording width. The carriage 103 is moved (return motion) from the right to the left in the diagram, thereby preparing for the next image recording. By repeating the movement of the carriage 103 and recording paper 111 a plurality of number of times, the image recording onto the recording paper 111 is executed.

Although the operation for recording the dots during the going motion of the carriage 103 has been described above, a reciprocating print in which dots are recorded at the time of not only the going motion but also the return motion can be also performed.

As mentioned above, the recording cartridge 101 is detachable for the carriage 103. In the embodiment, in place of the recording cartridge 101, a scanner cartridge 102 shown in FIG. 2 can be attached to the carriage 103. The scanner cartridge 102 photoelectrically converts the image of the original which is conveyed by the paper feed roller 110 in place of the recording paper 111 and generates an image signal.

Figure 2:
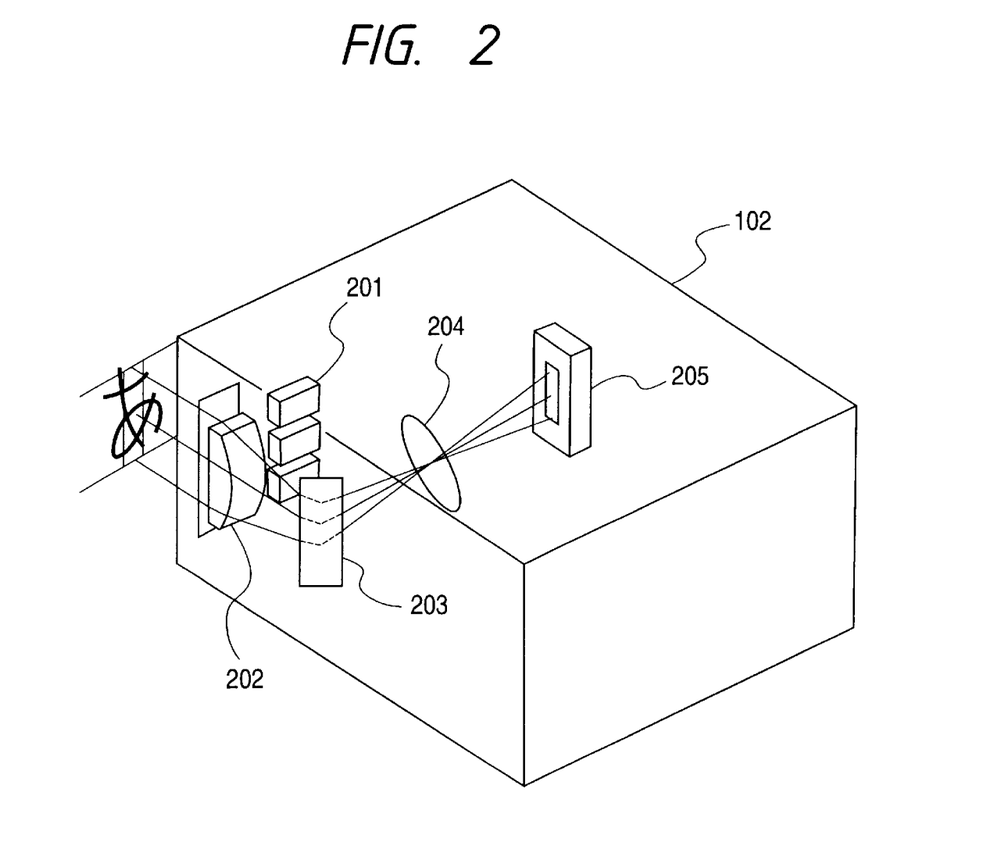
FIG. 2 is a constructional diagram of a scanner unit.

In FIG. 2, reference numeral 201 denotes an LED to expose the original to be read. One LED is provided for each of R (red), G (green), and B (blue). A fluorescent lamp or the like other than the LED can be also used as a light source here. Irradiation lights of, for example, cyan, magenta, and yellow, or the like other than RGB can be also used. It is further also possible to construct in a manner such that a white light source is used and color filters are provided between the white light source and the sensors or are provided on the light source or sensors. Reference numeral 202 denotes a field lens; 203 a mirror; and 204 a master lens. The reflection light from the original exposed by the LEDs 201 is guided to a line sensor 205 by those component elements 202 to 204. The line sensor 205 has photoelectric converting elements of 128 pixels arranged in a line and generates an analog image signal of a level according to a light/dense state of the original image.

The reading operation for reading the original image by attaching the scanner cartridge 102 to the carriage 103 in place of the recording cartridge 101 will now be described hereinbelow.

First, the original to be read is replaced with the recording paper Ill and is conveyed to a predetermined reading position by the paper feed roller 110. The carriage 103 to which the scanner cartridge 102 is attached is reciprocated from the left to the right shown in the diagram in a manner similar to the foregoing recording operation. Thus, the image on the original is read by the line sensor 205 by the width of 128 pixels. After completion of the reciprocating motion of the carriage 103 of one time, the paper feed roller 110 rotates, moves the original by a distance corresponding to 128 pixels, and moves the carriage 103 from the right to the left, thereby preparing for the next image reading operation. By repeating the movement of the carriage 103 and original a plurality of number of times, the image reading operation of the original is executed.

Although the example of reading the original image during the going motion has been described here, the image can be also read during the returning motion as well as during the going motion.

A movement amount of the original by the rotation of the paper feed roller 110 by the roller motor 112 is not limited to only the distance corresponding to 128 pixels mentioned above. The original can be also moved by a distance of, for example, 64 pixels of ½ or 32 pixels of ¼ of 128 pixels.

As will be explained in detail hereinbelow, the scanner cartridge 102 can perform the reading operation in either one of a binary reading mode of reading the image as black and white binary information and a multivalue reading mode of reading the image as multivalue information of, three or more values including a halftone density, for instance, 8 bits and 64 gradations.

Figure 3:
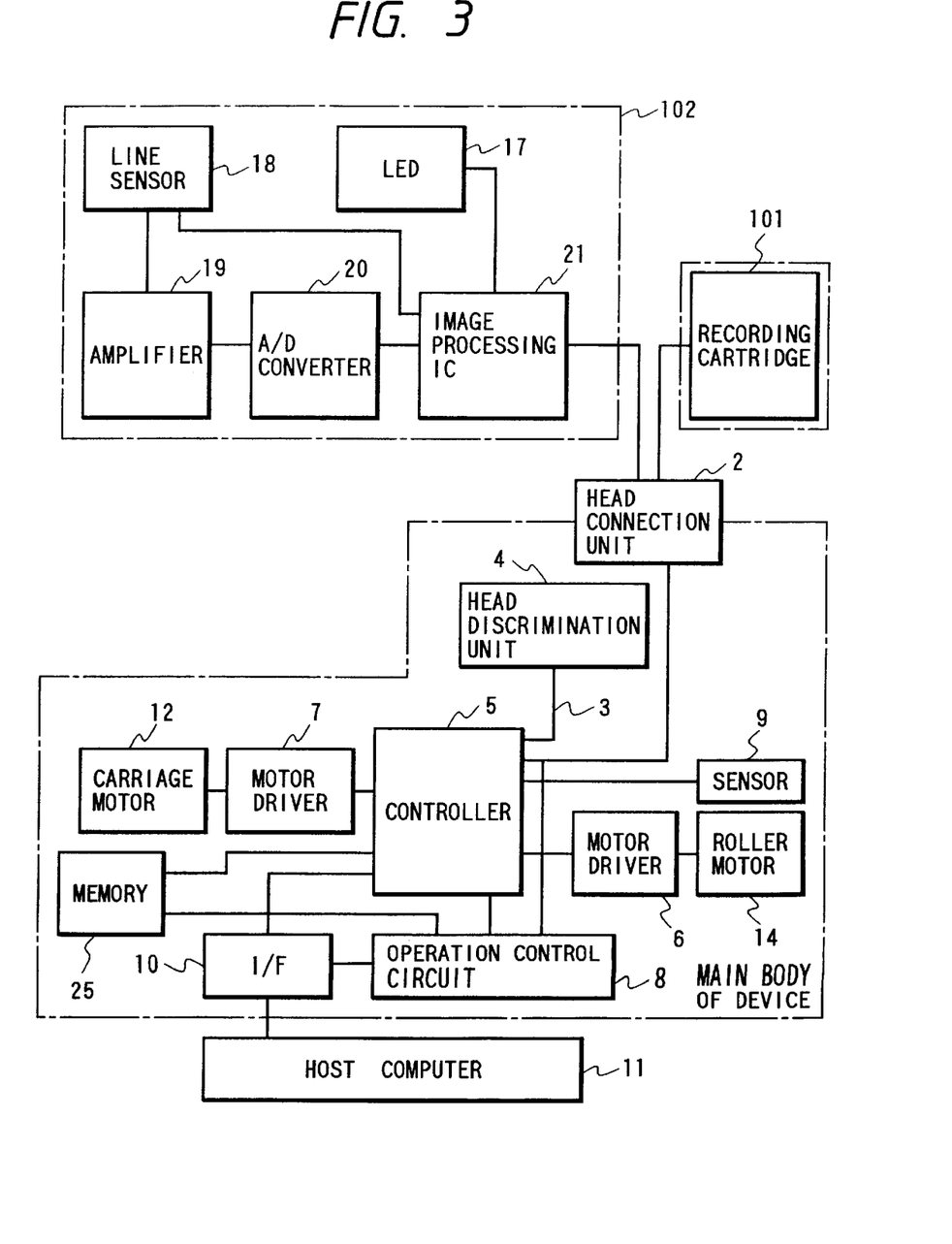
FIG. 3 is a whole block diagram of the apparatus.

FIG. 3 is a block diagram showing the whole recording/reading apparatus of FIG. 1. The recording cartridge 101 or scanner cartridge 102 which is attached in accordance with a use purpose is connected to a head connection unit 2. A head discrimination unit 4 to discriminate which one of the recording cartridge 101 and the scanner cartridge 102 has been attached to the carriage 103 is provided for the head connection unit 2. Discrimination information is sent to a controller 5 of the main body of the device.

The operation in case of using the device main body as a recording apparatus will be first explained together with a description of a function and a structure of each block. In this case, the recording cartridge 101 is connected to the head connection unit 2.

Recording data such as character, image, or the like to be subsequently recorded (or printed; hereinafter, referred to as "record") is transferred from a host computer 11 through an interface (I/F) 10 while being subjected to a control of the host computer 11 and an operation control circuit 8. The controller 5 receives the recording data, processes it to dot data to record dots onto the recording paper by the recording cartridge 101, and stores the processed dot data into a memory 25. Further, the controller 5 reads out the dot data from the memory 25 while being subjected to the control of the operation control circuit 8, serially transmits the recording data to the recording cartridge 101 synchronously with a recording clock through a head connection line 3 (FPC 108 in FIG. 1) and head connection unit 2, and records the character, image, or the like onto the recording paper by dots.

A roller motor 14 (corresponding to the roller motor 112 in FIG. 1) is rotated by a motor driver 6 which is controlled by the operation control circuit 8 and controller 5 and feeds the recording paper.

The carriage 103 in FIG. 1 is moved by driving a carriage motor 12 by a motor driver 7 which is controlled by the operation control circuit 8 and controller 5.

A sensor 9 discriminates whether the recording paper or original for image reading has been set to a paper supporting base plate (not shown) or not, whether the carriage 13 exists at a start position or not, and the like.

Not only the foregoing character and image data but also various parameters regarding the image recording and reading mentioned above are inputted from the host computer 11 to the interface 10. In accordance with the various parameters, the operation control circuit 8 executes various operation controls to record and read the image.

The operation in case of using the apparatus as an image reading apparatus will now be described. In this case, the scanner cartridge 102 is connected to the head connection unit 2.

As mentioned above, when the apparatus operates as an image reading apparatus as well, the scanner cartridge 102 scans the original by a motion similar to the motion when the recording head 1 operates in the recording mode. An LED 17 (corresponding to the LED 201 in FIG. 2) built in the scanner cartridge 102 irradiates the original. A line sensor 18 (corresponding to the line sensor 205 in FIG. 2) having a photoelectric converting function detects the reflection light of a character, natural image, or the like. A signal detected by the line sensor 18 is amplified by an amplifier 19 to a level that is optimum to be handled by an analog/digital converter (hereinafter, referred to as an A/D) 20 and is inputted to the A/D 20. The signal converted into the digital data of eight bits for each pixel by the A/D 20 is subjected to image processes such as shading correction, binarization, and the like by an image processing IC 21. The processed signal is serially transferred as image data to the device main body synchronously with a data clock.

When the image data is transferred in the device main body, the image data is sent to the host computer 11 along a reverse path of the flow of the recording data upon recording mentioned above. That is, the image data is transmitted from the image processing IC 21 through the head connection unit 2, head connection line 3, and controller 5 and is stored into the memory 25. Further, the controller 5 synchronously transmits the image data to the host computer 11 through the interface 10. In this instance, the controller 5 converts the image data received from the image processing IC 21 into a form that can be easily transmitted by the interface 10 or into a form that can be easily handled by the host computer 11 and transfers under control of the operation control circuit 8.

A serial transfer of the image data to the device main body in the image reading mode will now be described. As mentioned above, the apparatus of the embodiment can operate in the binary reading mode and multivalue reading mode. The reading mode is instructed from the host computer 11 and the operation control circuit 8 controls the operation of the apparatus in accordance with the image reading mode.

Figure 4:
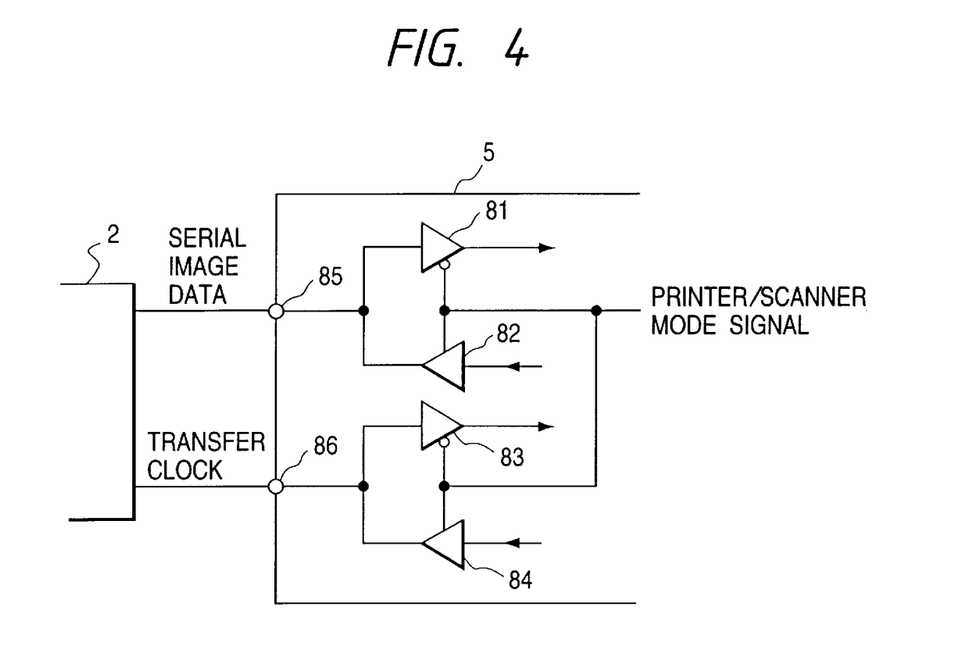
FIG. 4 is a diagram showing an input/output of a controller.

FIG. 4 is a diagram showing an input/output unit of the serial image data and transfer clock of the controller 5 in the device main body. Reference numerals 81 to 84 denote gate circuits which are made operative by a printer/scanner mode signal to set whether the apparatus is used as an image recording apparatus or an image reading apparatus, respectively.

Namely, as mentioned above, when the discrimination unit 4 discriminates that the recording cartridge 101 has been attached to the carriage 103, the gate circuits 82 and 84 are activated by the printer/scanner mode signal. The serial image data and transfer clock are supplied from the controller 5 to the head connection unit 2 through terminals 85 and 86 by the gate circuits 82 and 84.

On the other hand, when the discrimination unit 4 discriminates that the scanner cartridge 102 has been attached to the carriage 103, the gate circuits 81 and 83 are activated by the printer/scanner mode signal. The serial image data and transfer clock are transferred from the head connection unit 2 to the controller 5 through the terminals 85 and 86 by the gate circuits 81 and 83.

As mentioned above, in case of using the apparatus as an image recording apparatus, the terminals 85 and 86 of the controller 5 are used as output terminals, and in case of using the apparatus as an image reading apparatus, the terminals 85 and 86 are used as input terminals.

When it is not determined that the device main body is used as either the image recording apparatus or the image reading apparatus (before it is discriminated), all of the gate circuits 81 to 84 are held in a high impedance state.

Figure 5:
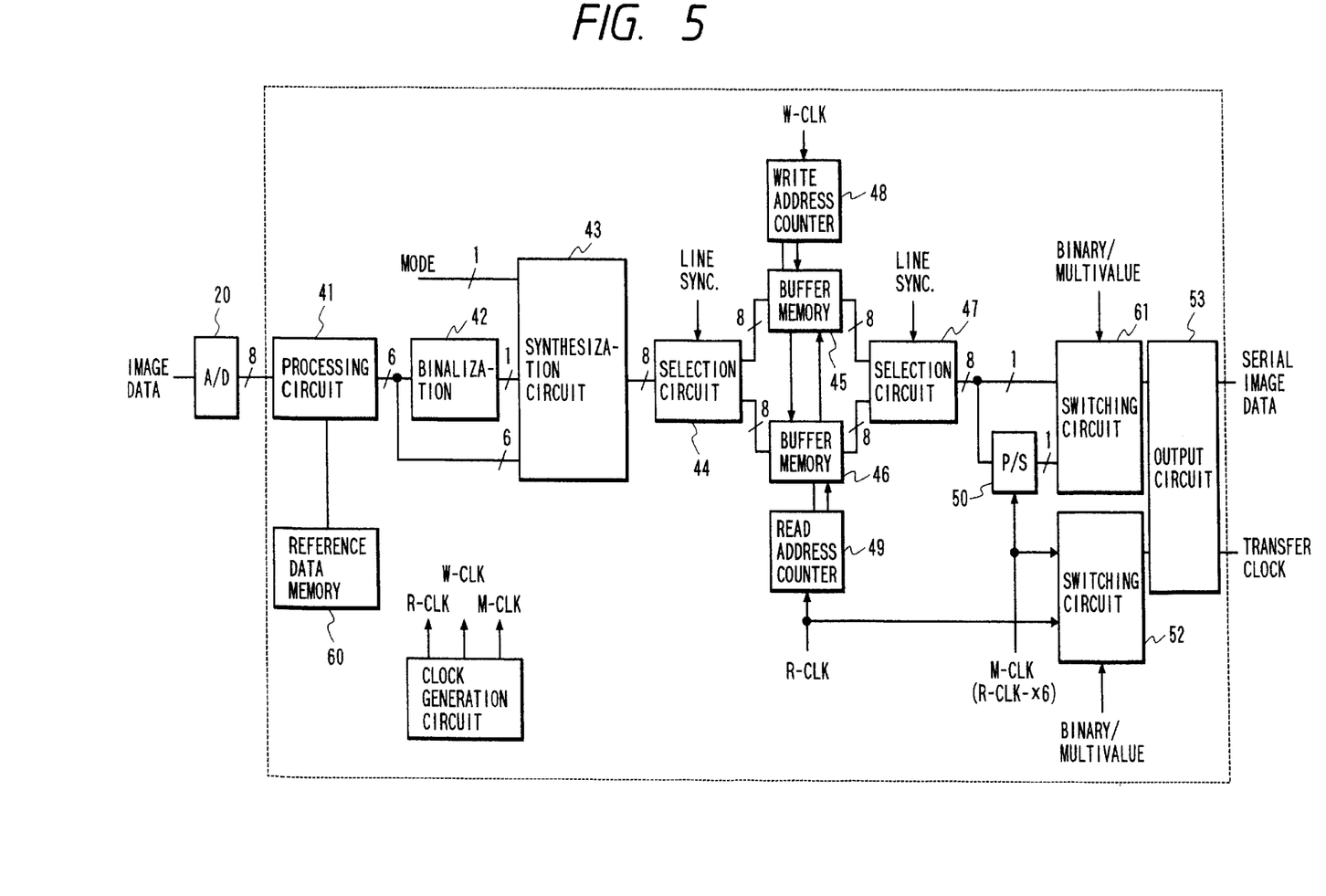
FIG. 5 is a block diagram of an image processing IC.

FIG. 5 shows a construction of the image processing IC 21 of the scanner cartridge 102. The image data converted into the parallel digital data of 8 bits per pixel by the A/D 20 as mentioned above is inputted to the image processing IC 21.

In the image processing IC 21, first, a processing circuit 41 executes image processes such as shading correction, edge enhancement, and the like to the 8-bit digital image data from the A/D 20. By the above image processes, the 8-bit digital image data from the A/D 20 becomes the 6-bit parallel multivalue image data and is outputted from the processing circuit 41.

Reference data such as white reference data or the like is stored into a reference data memory 60 connected to the processing circuit 41. That is, the read data when predetermined white serving as a reference is read is stored into the reference data memory 60 as white reference data which is a maximum value of the image that can be read by the sensor 205 in the image reading operation. Further, the read data when a predetermined black serving as a reference is read is stored into the reference data memory 60 as black reference data which is a minimum value of the image that can be read by the sensor 205.

The white reference data and black reference data are data for performing what is called a shading correction to correct unevenness of the sensor 205, lens 204, light sources 201, and the like. That is, with respect to each pixel of the sensor 205, for example, a value obtained by subtracting the black reference data from the white reference data is used as a reference, a value obtained by getting a ratio of the read data of each pixel of the sensor 205 when the original is read is used as original read data and is outputted. Thus, the image read data of a high precision in which the unevenness was corrected (shading correction) can be obtained.

There is a case where the white reference data and black reference data slightly change due to a change in accumulation time in the photoelectric conversion of the sensor 205. As for the reflection light which is inputted to the sensor 205, an unevenness of the input reflection light to each pixel of the sensor 205 changes even in dependence on the positional relation of the light sources.

For example, since the accumulation time is changed in the binary mode and multivalue mode mentioned above, the reference data also changes. Therefore, the reference data corresponding to each mode is necessary. Further, even in the case where the light sources (LEDs) of R (red), G (green), and B (blue) to construct the color scanner are individually lit on as shown in the positional relation among the light sources mentioned above, since the irradiating positions and irradiating conditions such as illuminance and the like are slightly different from one another, the reference data and the like differ depending on R, G, and B and are respectively necessary.

Now, assuming that the reference data memory 60 (first storage means) is allowed to have an infinite capacity, it is sufficient to store all of the reference data into the reference data memory. However, the capacity of the reference data memory is limited because of problems of the costs, space, and the like of the whole apparatus.

In the embodiment, therefore, all of the reference data corresponding to the accumulation time, light sources (RGB), and the like as mentioned above are stored in the memory 25 (second storage means) of the device main body and they are read out as necessary and written into the reference data memory 60 of the scanner cartridge. For example, in case of sequentially lighting on the R, G, and B light sources, the reference data corresponding to the timings for lighting on the light sources (when R is lit on, when G is lit on, and when B is lit on) is read out from the memory 25 of the device main body by the operation control circuit 8 serving as control means and is written into the reference data memory 60 provided in the image processing IC 21 of the scanner cartridge 102. The shading correction is performed to the image data by the correction data written in the reference data memory 60. It will be obviously understood that the memory to store all of the reference data or the like is not limited to the memory 25 of the device main body and the memory of the host computer 11 connected to the device main body can be also used.

In case of using the reference data memory 60 as mentioned above, as a memory capacity of the reference data memory 60, for example, when a sensor of 128 pixels is installed as a sensor 18, it is sufficient that a memory having a capacity such that the data of about (128 pixels×8 bits) in case of the white reference data and (128 pixels×4 bits) (since the level on the black side is low, the number of bits is set to 4 bits) in case of the black reference data can be stored is installed in the scanner cartridge 102. Consequently, a cartridge of a low capacity, low costs, a small size, and a light weight can be constructed as a scanner cartridge.

In the data to be stored in the reference data memory 60, for example, assuming that the amplifier 19 is an amplifier having an automatic gain controller, since a gain changes due to variations of the accumulation time, kind (R, G, B) of light sources, and the like, it is similarly necessary to also store an amplification factor of the amplifier as reference data. Therefore, in a manner similar to the foregoing embodiment, it is sufficient that all of the gain data depending on the accumulation time and the kind of light sources are stored in the memory 25 of the device main body or the memory of the host computer 11 and are read out only as necessary in accordance with the accumulation time and the kind of light source and are written into the reference data memory 60 of the scanner unit.

The multivalue image data of 6 bits from the processing circuit 41 is inputted to a binarization circuit 42 and a synthesization circuit 43. The binarization circuit 42 compares the 6-bit multivalue image data which is inputted with a predetermined threshold value, thereby binarizing and converting into binary image data of one bit of each pixel. The binary image data is inputted to the synthesization circuit 43.

Figure 6:
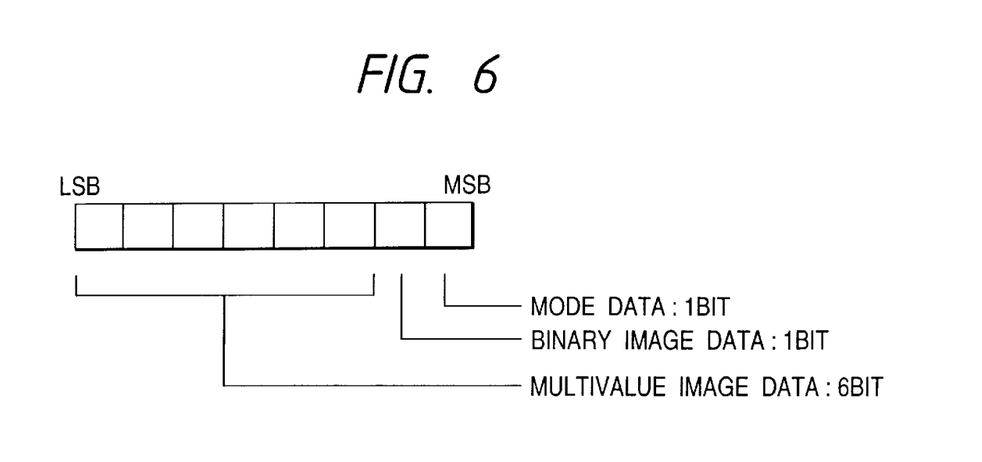
FIG. 6 is a diagram showing a format of image data.

The 6-bit parallel multivalue image data from the processing circuit 41, the 1-bit binary image data from the binarization circuit 42, and binary mode data indicative of the mode (for example, indicating the presence or absence of the edge enhancement process) of the input image data are inputted to the synthesization circuit 43. Those three data of total eight bits are synthesized and the resultant data is outputted as a parallel image data of eight bits. FIG. 6 shows the 8-bit parallel image data which is outputted from the synthesization circuit 43. As shown in the diagram, the mode data of one bit is set into the most significant bit, the binary image data is set into the second bit, and the 6-bit multivalue image data is set into the lower six bits, respectively.

The 8-bit parallel image data from the synthesization circuit 43 is written into a buffer memory 45 or a buffer memory 46 through a selection circuit 44 in accordance with a write address from a W address counter 48. Each of the buffer memories 45 and 46 is made up of an SRAM and has a capacity capable of storing the image data of one line (128 pixels) by the line sensor 205. Each time one line is read by the line sensor 205, the buffer memories 45 and 46 are alternately selected by the selection circuit 44 in response to a line sync signal, thereby writing the image data. Outputs of the buffer memories 45 and 46 are inputted to a selection circuit 47. In response to the line sync signal, the selection circuit 47 selects the buffer memory in which the writing of the image data of one line has been completed. The image data which is read out in accordance with a read address from an R address counter 49 from the selected buffer memory is selected and outputted.

Figure 7:
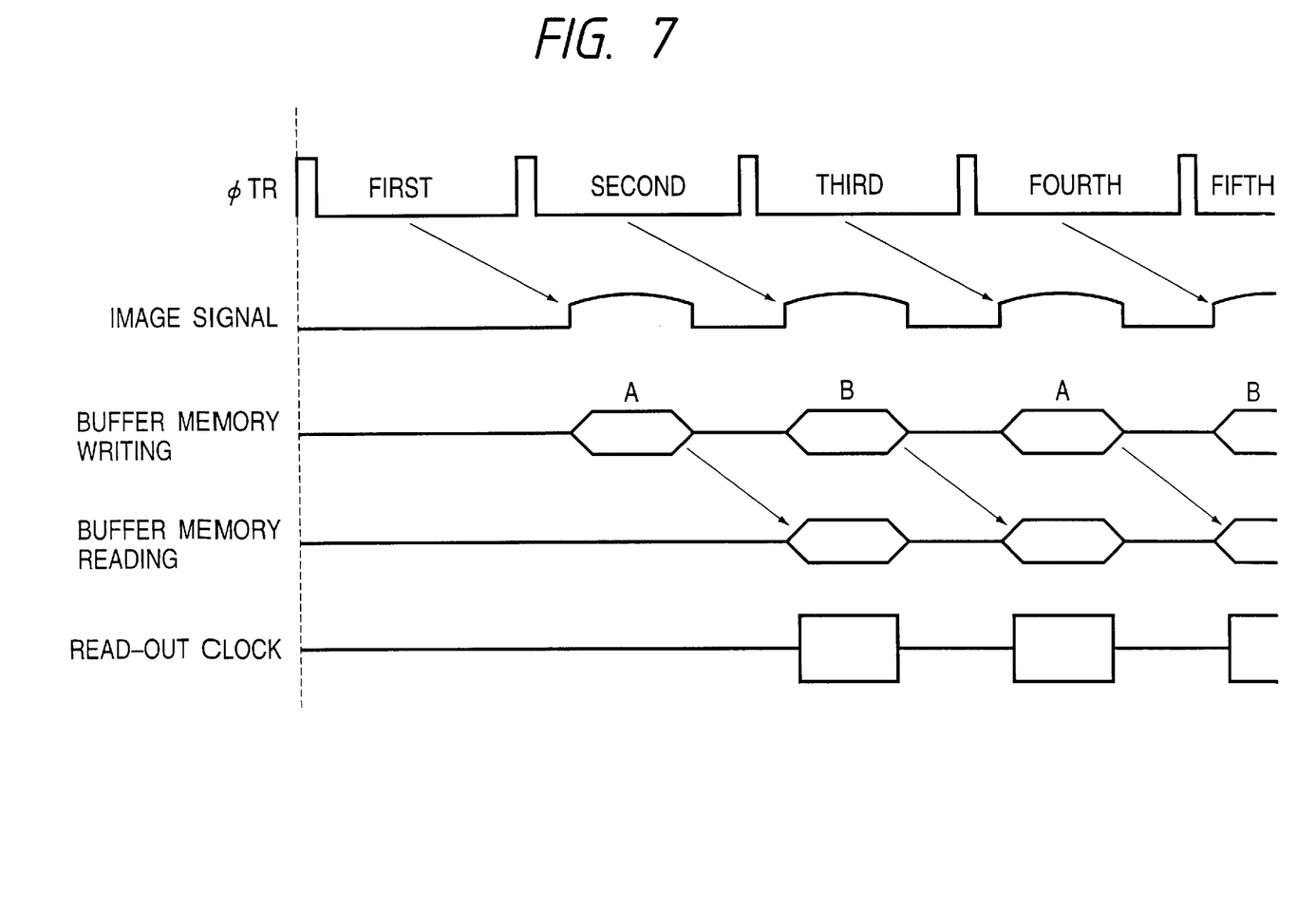
FIG. 7 is a timing chart showing an input/output of image data regarding a buffer memory.

FIG. 7 shows an input/output timing regarding the buffer memories 45 and 46 of the image data.

In the diagram, φTR denotes a signal to specify the accumulation time of the line sensor 18 and is a signal synchronized with a reading period of one line of the line sensor 18.

The image signal (analog signal) read by the line sensor 18 in response to the first φTR signal is read out from the line sensor 18 synchronously with the second φTR signal and is inputted to the amplifier 19. Further, the image signal is converted into the 8-bit digital image data by the A/D 20 and is written into the buffer memory 45. The digital image data written in the buffer memory 45 as mentioned above is read out from the buffer memory 45 in response to a read-out clock R-CLK synchronously with the third φTR signal.

The image signal read by the line sensor 18 in response to the second φTR signal is read out from the line sensor 18 synchronously with the third φTR signal and is written into the buffer memory 46 through the amplifier 19 and A/D 20. The image signal is read out from the buffer memory 46 synchronously with the fourth φTR signal. The above operations are executed to the image signals read out by the line sensor 18 in response to the third, fourth, . . . φTR signal.

That is, the selection circuits 44 and 47 select the different buffer memories. Thus, the buffer memories operate as what is called a double buffer such that while the image data is written into the buffer memory selected by the selection circuit 44, the other buffer memory is selected by the selection circuit 47, thereby reading out the image data.

The parallel 8-bit image data from the buffer memory selected by the selection circuit 47 is sequentially inputted to a parallel/serial conversion circuit (hereinafter, referred to as a P/S) 50. The binary image data of one bit of the second bit among eight bits of the output of the selection circuit 47 is sequentially inputted to a switching circuit 51.

The P/S 50 converts the parallel image data of eight bits which are sequentially inputted in parallel into serial image data of eight bits and serially outputs to the switching circuit 51 in response to a clock M-CLK. The R (read) address counter 49 which generates read addresses of the buffer memories 45 and 46 generates addresses synchronously with the clock R-CLK. The clock M-CLK of a frequency which is eight times as high as a frequency of R-CLK to the R address counter 49 is inputted to the P/S 50.

Therefore, the binary image data which is sequentially inputted from the selection circuit 47 to the switching circuit 51 is serial binary data synchronized with R-CLK. The serial data which is inputted from the P/S 50 to the switching circuit 51 is synchronized with M-CLK of a frequency which is eight times as high as the frequency of R-CLK.

The switching circuit 51 performs a switching operation in accordance with an instruction of the binary reading mode or multivalue reading mode from the host computer 11. When the binary reading mode is instructed, the switching circuit 51 selects the serial binary image data from the selection circuit 47. When the multivalue reading mode is instructed, the switching circuit 51 selects the serial image data which was parallel/serial converted by the P/S 50. The selected image data is supplied to an output circuit 53.

A switching circuit 52 performs the switching operation in accordance with an instruction of the reading mode from the host computer 11 in a manner similar to the switching circuit 51. When the binary reading mode is instructed, the switching circuit 52 selects R-CLK which is inputted to the R address counter 49 as a transfer clock. When the multivalue reading mode is instructed, the switching circuit 52 selects M-CLK which is inputted to the P/S circuit 50 as a transfer clock. The selected clock is supplied to the output circuit 53.

Figure 8:
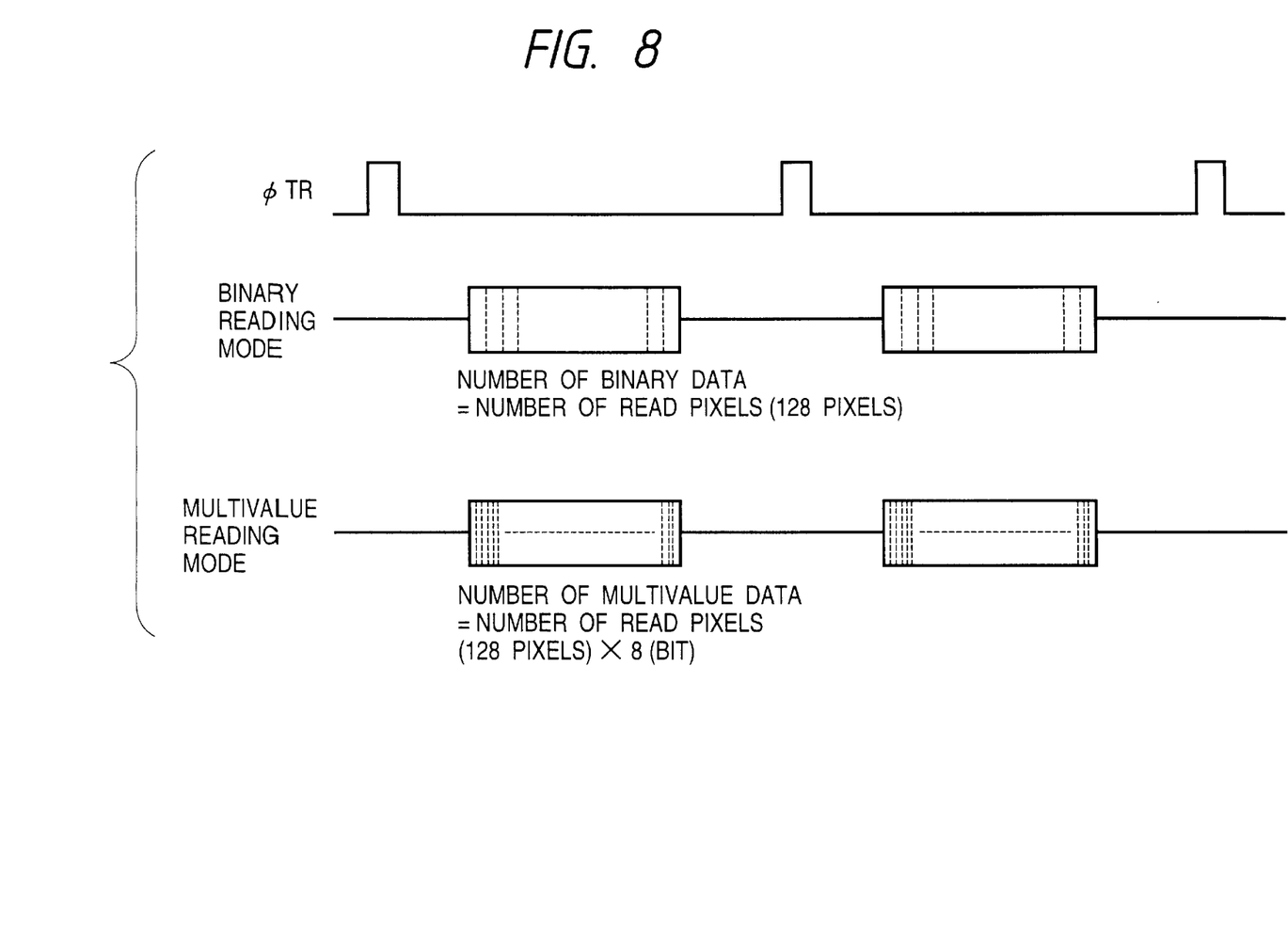
FIG. 8 is a timing chart showing a transferring operation of the image data.

FIG. 8 shows output image data from the output circuit 53.

In both of the binary reading mode and the multivalue reading mode, the serial image data of one line (128 pixels) is outputted from the output circuit 53 in an interval of one period of the $\phi$TR signal. In the binary reading mode, therefore, the binary data of 128 bits is serially outputted for one period of the $\phi$TR signal in response to R-CLK. In the multivalue reading mode, the multivalue data of 1024 bits (=8 bits×128 pixels) is serially outputted for one period of the $\phi$TR signal in response to M-CLK (of a frequency which is eight times as high as the frequency of R-CLK). As mentioned above, the frequency of the transfer clock is switched depending on the binary reading mode and the multivalue reading mode. Thus, the multivalue image data can be transferred within the same time as the transfer time of the binary image data. Each of the clocks of W-CLK, R-CLK, and M-CLK in the above description is formed by frequency dividing a fundamental clock from a quartz oscillator by a clock generation circuit 54.

In the above embodiment, the reason why the 6-bit parallel image data as a result obtained by image processing the 8-bit parallel image data from the A/D 20 by the image processing circuit 41 is not used as it is and the mode data of one bit and the binary image data of one bit are added to the 6-bit parallel image data and the resultant image data is handled as data of total eight bits is because the host computer 11 and the controller 5 and the like of the device main body are suitable for handling the data on an 8-bit unit basis (byte unit) and a higher processing efficiency is derived by using the 8-bit data.

It is also possible to output the 6-bit parallel image data itself from the processing circuit 41 as multivalue image data without converting to the 8-bit data. In this case, since the image data after completion of the parallel/serial conversion becomes serial binary data of six bits per pixel, a frequency of each of a clock for parallel/serial conversion and a transfer clock is six times as high as a frequency for transferring the binary image data. A serial transfer speed of the image data in the multivalue reading mode is reduced. A decrease in power source current, a suppression of radiation noises, and the like are performed.

Figure 9A:
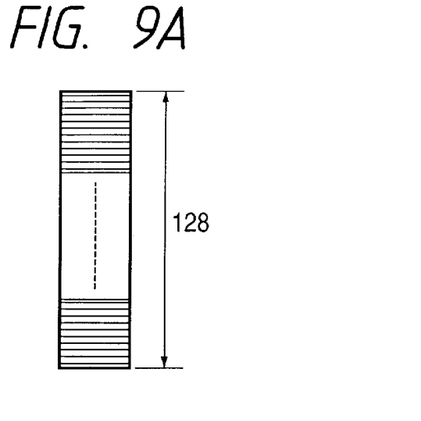
FIGS. 9A and 9B are diagrams showing reading pixel positions of a line sensor.
Figure 10:
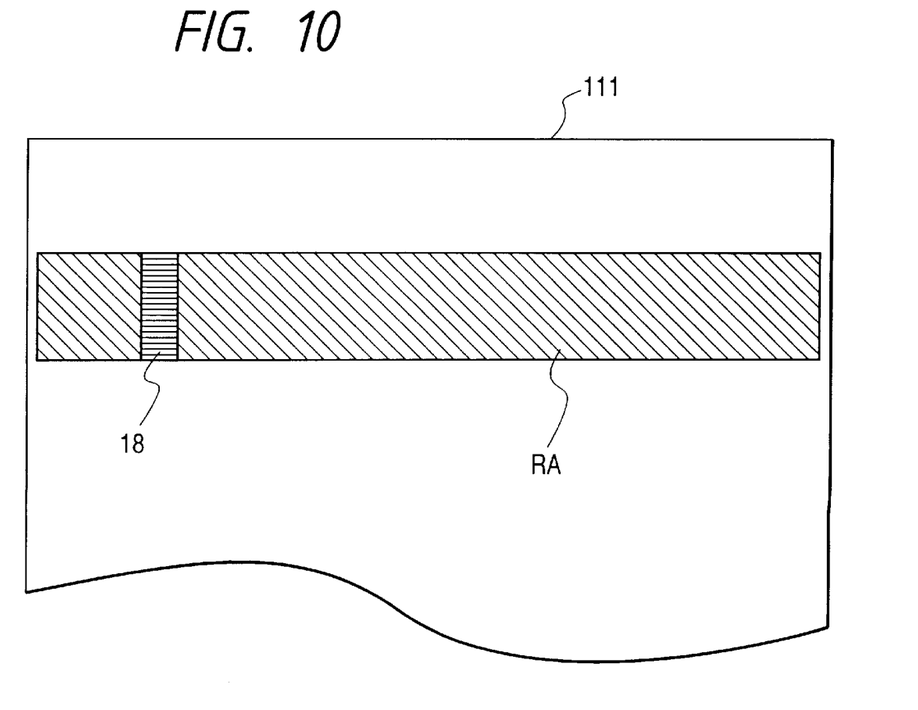
FIG. 10 is a diagram showing a reading range on an original.

Now, assuming that the number of pixels of the line sensor 18 is equal to 128, when the image is read in the binary reading mode, the image reading operation is performed by using the whole line sensor 18 as shown in FIG. 9A. FIG. 10 shows a reading range RA on the original 111 when the original image of one line is scanned by using all of 128 pixels of the line sensor 18. Now, assuming that a width of one line is equal to 210 mm (lateral direction of the A4 size) and a resolution is equal to 360 dpi, a data amount in this instance is obtained by the following equation (1).

$$1(\text{bit})\times128(\text{pixels})\times360/25.4\times210(\text{mm}) =380976.4(\text{bits}) \quad (1)$$

A memory capacity of about 381 kbits or more is needed. That is, it is sufficient to install a memory having a capacity of 1 Mbits as a memory 25 of the device main body.

Since the memory 25 is also used when the device main body is made operative as a recording apparatus, the memory 25 has a least necessary capacity (for example, 2 Mbits) which is also used for other operation controls.

The operation in the multivalue reading mode of eight bits will now be described. In the 8-bit multivalue reading mode, a data amount in case of executing the reading operation by using all of the pixels of the line sensor 18 can be calculated by multiplying the value of the equation (1) with eight bits. That is, a memory capacity of 3.05 Mbits (=8×380976.4) is necessary and is a capacity such that the foregoing memory capacity has to be fairly increased, so that such a construction is unpreferable because of an increase in costs and the like. A serial image transfer speed from the scanner cartridge 102 also has to be set to a high speed.

Figure 9B:
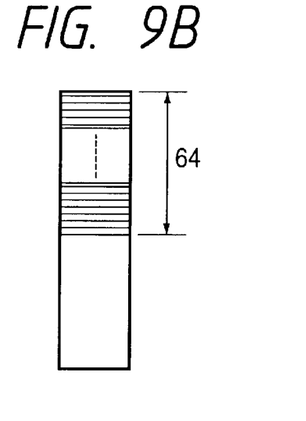

In the embodiment, therefore, in the 8-bit multivalue reading mode, as shown in FIG. 9B, by setting the number of reading pixels to 64 as ½ of all of the 128 pixels of the line sensor 18, a data amount per scan can be reduced and the serial transfer speed can be reduced. The memory 25 is used as it is, thereby enabling the multivalue image to be read.

The operation of the image processing IC 21 regarding the foregoing binary reading mode and multivalue reading mode will now be described with reference to FIG. 5.

When the apparatus operates in the binary reading mode in accordance with an instruction of the host computer 11, an analog signal of an image obtained by reading the original by using all of the 128 pixels of the line sensor 18 is amplified by the amplifier 19 and is converted into the 8-bit digital data by the A/D 20. In this instance, in response to the instruction of the binary reading mode, the binarization circuit 42 (black and white; namely, binary) discriminates the digital data on the basis of a predetermined threshold value and outputs and writes the resultant binary data as many as all of 128 pixels into the buffer memory A45 or B46.

On the other hand, when the apparatus operates in the multivalue reading mode, in a manner similar to the operation in the binary reading mode, an analog signal of an image obtained by reading the original by using all of 128 pixels of the line sensor 18 is amplified by the amplifier 19 and is converted into the 8-bit digital data (multivalue data) by the A/D 20. At this time, the data corresponding to the pixels of the number of ½ of all of the pixels of the line sensor 18 is selected and written into the buffer memory 45 or 46 in accordance with an instruction of the multivalue reading mode. That is, the data corresponding to the 64 (=128/2) pixels shown in FIG. 9B is processed by the image processing IC 21 and is outputted as multivalue data. It will be obviously understood that an arbitrary portion among 128 pixels can be used as a range corresponding to 64 pixels.

As a scanning operation of the scanner cartridge in the multivalue reading mode, since a reading width by the scan of one time is set to ½ of the width in the binary reading mode, a moving width of the original is also set to ½. The scanning operation in the multivalue reading mode is executed a number of scanning times that is twice as large as that in the binary reading mode.

As mentioned above, in the multivalue reading mode, by setting the number of reading pixels of one line to ½ of that in the binary reading mode, a frequency of the transfer clock which is used for serially transferring the image data in the multivalue reading mode can be set to four times as high as that in the binary reading mode.

With the above construction, the binary reading operation and multivalue reading operation of an image can be realized without enlarging a scale of the construction as a recording apparatus of the device main body and without increasing the costs.

Although the line sensor of 128 pixels has been used in the above embodiment, the number of pixels of the line sensor is not limited to 128. It will be understood that the multivalue reading operation can be also executed by using gradations other than eight bits.

The invention is not limited to the common apparatus for image recording and image reading but can be also applied to an apparatus only for use in image reading. Further, an image recording system other than the ink jet system can be also used.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
    (a) reading means for reading an image and outputting a color signal;
    (b) first storage means capable of storing at least one correction data to correct the color signal outputted from said reading means;
    (c) second storage means in which a plurality of correction data to correct said color signal have been stored; and
    (d) control means for selectively transferring said plurality of correction data stored in said second storage means to said first storage means according to an operation condition of said reading means,
    wherein said reading means and said first storage means are provided in a cartridge that is detachable for said apparatus.

2. An apparatus according to claim 1, wherein said second storage means stores black reference data of said color signal.

3. An apparatus according to claim 1, further comprising amplifying means for amplifying said color signal, and wherein said second storage means stores an amplification factor of said amplifying means.

4. An apparatus according to claim 1, wherein said second storage means stores shading correction data of said color signal.

5. An apparatus according to claim 1, wherein said second storage means stores white reference data of said color signal.

6. An apparatus according to claim 1, wherein said reading means outputs a plurality of different color signals and said second storage means stores the correction data for each of said color signals.

7. An apparatus according to claim 6, further comprising amplifying means for amplifying said color signal, and wherein said second storage means stores an amplification factor of said amplifying means.

8. An apparatus according to claim 6, wherein said second storage means stores shading correction data of said color signal.

9. An apparatus according to claim 6, wherein said second storage means stores white reference data of said color signal.

10. An apparatus according to claim 6, wherein said second storage means stores black reference data of said color signal.

11. An apparatus according to claim 1, wherein an another cartridge having output means for outputting image data is also detachable for said apparatus.

12. An image reading apparatus comprising:
    (a) reading means for reading an image and outputting an image signal;
    (b) mode switching means for switching a reading mode by said reading means;
    (c) first storage means capable of storing at least one correction data to correct the image signal which is outputted from said reading means;
    (d) second storage means in which a plurality of correction data for correcting said image signal and corresponding to said reading mode have been stored; and
    (e) control means for selectively transferring said plurality of correction data stored in said second storage means to said first storage means according to an operation condition of said reading means,
    wherein said reading means and said first storage means are provided in a cartridge that is detachable for said apparatus.

13. An apparatus according to claim 12, wherein said mode switching means switches a binary mode and a multivalue mode and said second storage means stores correction data in the binary mode and correction data in the multivalue mode.

14. An apparatus according to claim 13, wherein said first and second storage means store shading correction data of said image signal.

15. An apparatus according to claim 13, wherein said first and second storage means store black reference data of said image signal.

16. An apparatus according to claim 13, wherein said first and second storage means store white reference data of said image signal.

17. An apparatus according to claim 13, further comprising amplifying means for amplifying said image signal, and wherein said first and second storage means store an amplification factor of said amplifying means.

18. An apparatus according to claim 12, wherein said mode switching means switches a first mode in which said reading means reads the image at a first resolution and a second mode in which said reading means reads the image at a second resolution, and said second storage means stores correction data in said first mode and correction data in said second mode.

19. An apparatus according to claim 18, wherein said first and second storage means store shading correction data of said image signal.

20. An apparatus according to claim 18, wherein said first and second storage means store black reference data of said image signal.

21. An apparatus according to claim 18, wherein said first and second storage means store white reference data of said image signal.

22. An apparatus according to claim 18, further comprising amplifying means for amplifying said image signal, and wherein said first and second storage means store an amplification factor of said amplifying means.

23. An apparatus according to claim 12, wherein an another cartridge having output means for outputting image data is also detachable for said apparatus.

24. An image reading apparatus comprising:
(a) a plurality of light sources for irradiating an original image;
(b) reading means for reading the original image irradiated by said light sources and outputting a read image signal;
(c) first storage means capable of storing at least one correction data to correct the image signal outputted from said reading means;
(d) second storage means in which a plurality of correction data to correct said image signal have been stored in correspondence to said light sources; and
(e) control means for selectively transferring said plurality of correction data stored in said second storage means to said first storage means according to an operation condition of said reading means,
wherein said reading means and said first storage means are provided in a cartridge that is detachable for said apparatus.

25. An apparatus according to claim 24, further comprising amplifying means for amplifying said image signal, and wherein said second storage means stores an amplification factor of said amplifying means.

26. An apparatus according to claim 24, wherein said second storage means stores shading correction data of said image signal.

27. An apparatus according to claim 24, wherein said second storage means stores white reference data of said image signal.

28. An apparatus according to claim 24, wherein said second storage means stores black reference data of said image signal.

29. An apparatus according to claim 24, wherein an another cartridge having output means for outputting image data is also detachable for said apparatus.

30. An apparatus according to claim 24, wherein said second storage means stores correction data for each of said plurality of light sources.

31. An apparatus according to claim 30, further comprising amplifying means for amplifying said image signal, and wherein said second storage means stores an amplification factor of said amplifying means.

32. An apparatus according to claim 30, wherein said second storage means stores shading correction data of said image signal.

33. An apparatus according to claim 30, wherein said second storage means stores white reference data of said image signal.

34. An apparatus according to claim 30, wherein said second storage means stores black reference data of said image signal.

35. An image reading cartridge comprising:
reading means for reading an image and outputting a plurality of different color signals; and
first storage means capable of storing at least one correction data to correct each of the color signals outputted from said reading means,
wherein said image reading cartridge is detachably attached to a control apparatus having second storage means in which a plurality of correction data to correct each of said color signals have been stored and control means for selectively transferring said plurality of correction data stored in said second storage means to said first storage means according to an operation condition of said reading means.

36. A cartridge according to claim 35, further comprising amplifying means for amplifying said color signal, and wherein said second storage means stores an amplification factor of said amplifying means.

37. A cartridge according to claim 35, wherein said second storage means stores shading correction data of said color signal.

38. A cartridge according to claim 35, wherein said second storage means stores white reference data of said color signal.

39. A cartridge according to claim 35, wherein said second storage means stores black reference data of said color signal.

40. A cartridge according to claim 35, wherein an another cartridge having output means for outputting image data is also detachable for said control apparatus.

41. A cartridge according to claim 35, wherein said second storage means stores correction data for each of said color signals.

42. A cartridge according to claim 41, wherein said second storage means stores white reference data of said color signal.

43. A cartridge according to claim 41, wherein said second storage means stores black reference data of said color signal.

44. A cartridge according to claim 41, further comprising amplifying means for amplifying said color signal, and wherein said second storage means stores an amplification factor of said amplifying means.

45. A cartridge according to claim 41, wherein said second storage means stores shading correction data of said color signal.

46. An image reading cartridge comprising:
reading means for reading an image and outputting an image signal; and
first storage means capable of storing at least one correction data to correct the image signal outputted from said reading means,
wherein said image reading cartridge is detachably attached to a control apparatus having mode switching means for switching a reading mode by said reading means, second storage means in which a plurality of correction data for correcting said image signal and corresponding to said reading mode have been stored, and control means for selectively transferring said plurality of correction data stored in said second storage means to said first storage means according to an operation condition of said reading means.

47. A cartridge according to claim 46, wherein an another cartridge having output means for outputting image data is also detachable for said control apparatus.

48. A cartridge according to claim 46, wherein said mode switching means switches a binary mode and a multivalue mode, and said second storage means stores correction data in the binary mode and correction data in the multivalue mode.

49. A cartridge according to claim 48, wherein said first and second storage means store shading correction data of said image signal.

50. A cartridge according to claim 48, wherein said first and second storage means store black reference data of said image signal.

51. A cartridge according to claim 48, wherein said first and second storage means store white reference data of said image signal.

52. A cartridge according to claim 48, further comprising amplifying means for amplifying said image signal, and wherein said first and second storage means store an amplification factor of said amplifying means.

53. A cartridge according to claim 46, wherein said mode switching means switches a first mode in which said reading means reads the image at a first resolution and a second mode in which said reading means reads the image at a second resolution, and said second storage means stores correction data in said first mode and correction data in said second mode.

54. A cartridge according to claim 53, wherein said first and second storage means store shading correction data of said image signal.

55. A cartridge according to claim 53, further comprising amplifying means for amplifying said image signal, and wherein said first and second storage means store an amplification factor of said amplifying means.

56. A cartridge according to claim 53, wherein said first and second storage means store black reference data of said image signal.

57. A cartridge according to claim 53, wherein said first and second storage means store white reference data of said image signal.

58. An image reading cartridge comprising:
a plurality of light sources for irradiating an image of an original;
reading means for reading said original image irradiated by said light sources and outputting an image signal; and
first storage means capable of storing at least one correction data to correct the image signal outputted from said reading means,
wherein said image reading cartridge is detachably attached to a control apparatus having second storage means in which a plurality of correction data to correct said image signal have been stored in correspondence to said light sources and control means for selectively transferring said plurality of correction data stored in said second storage means to said first storage means according to an operation condition of said reading means.

59. A cartridge according to claim 58, further comprising amplifying means for amplifying said image signal, and wherein said second storage means stores an amplification factor of said amplifying means.

60. A cartridge according to claim 58, wherein said second storage means stores shading correction data of said image signal.

61. A cartridge according to claim 58, wherein said second storage means stores white reference data of said image signal.

62. A cartridge according to claim 58, wherein an another cartridge having output means for outputting image data is also detachable for said control apparatus.

63. A cartridge according to claim 58, wherein said second storage means stores black reference data of said image signal.

64. A cartridge according to claim 58, wherein said second storage means stores correction data for each of said plurality of light sources.

65. A cartridge according to claim 64, wherein said second storage means stores white reference data of said image signal.

66. A cartridge according to claim 64, wherein said second storage means stores shading correction data of said image signal.

67. A cartridge according to claim 64, wherein said second storage means stores black reference data of said image signal.

68. A cartridge according to claim 64, further comprising amplifying means for amplifying said image signal, and wherein said second storage means stores an amplification factor of said amplifying means.

69. A control apparatus to which an image reading cartridge having reading means for reading an image and outputting a plurality of different color signals and first storage means capable of storing at least one correction data to correct the color signals outputted from said reading means is detachably attached, comprising:
second storage means in which a plurality of correction data to correct said color signals have been stored; and
control means for selectively transferring said plurality of correction data stored in said second storage means to said first storage means according to an operation condition of said reading means.

70. An apparatus according to claim 69, wherein an another cartridge having output means for outputting image data is also detachable for said apparatus.

71. An apparatus according to claim 69, wherein said second storage means stores black reference data of said color signal.

72. An apparatus according to claim 69, further comprising amplifying means for amplifying said color signal, and wherein said second storage means stores an amplification factor of said amplifying means.

73. An apparatus according to claim 69, wherein said second storage means stores shading correction data of said color signals.

74. An apparatus according to claim 69, wherein said second storage means stores white reference data of said color signal.

75. An apparatus according to claim 69, wherein said second storage means stores correction data for each of said color signals.

76. An apparatus according to claim 75, further comprising amplifying means for amplifying said color signal, and wherein said second storage means stores an amplification factor of said amplifying means.

77. An apparatus according to claim 75, wherein said second storage means stores shading correction data of said color signals.

78. An apparatus according to claim 75, wherein said second storage means stores white reference data of said color signal.

79. An apparatus according to claim 75, wherein said second storage means stores black reference data of said color signal.

80. A control apparatus to which an image reading cartridge including reading means for reading an image and outputting an image signal and first storage means capable of storing at least one correction data to correct the image signal which is outputted from said reading means is detachably attached, comprising:
mode switching means for switching a reading mode by said reading means;
second storage means in which a plurality of correction data for correcting said image data and corresponding to said reading mode have been stored; and
control means for selectively transferring said plurality of correction data stored in said second storage means to said first storage means according to an operation condition of said reading means.

81. An apparatus according to claim 80, wherein said mode switching means switches a binary mode and a multivalue mode, and said second storage means stores correction data in said binary mode and correction data in said multivalue mode.

82. An apparatus according to claim 81, wherein said first and second storage means store shading correction data of said image signal.

83. An apparatus according to claim 81, wherein said first and second storage means store white reference data of said image signal.

84. An apparatus according to claim 81, wherein said first and second storage means store black reference data of said image signal.

85. An apparatus according to claim 81, further comprising amplifying means for amplifying said image signal, and wherein said first and second storage means store an amplification factor of said amplifying means.

86. An apparatus according to claim 80, wherein said mode switching means switches a first mode in which said reading means reads the image at a first resolution and a second mode in which said reading means reads the image at a second resolution, and said second storage means stores correction data in said first mode and correction data in said second mode.

87. An apparatus according to claim 86, wherein said first and second storage means store shading correction data of said image signal.

88. An apparatus according to claim 86, wherein said first and second storage means store white reference data of said image signal.

89. An apparatus according to claim 86, wherein said first and second storage means store black reference data of said image signal.

90. An apparatus according to claim 86, further comprising amplifying means for amplifying said image signal, and wherein said first and second storage means store an amplification factor of said amplifying means.

91. A control apparatus to which an image reading cartridge including a plurality of light sources to irradiate an image of an original, reading means for reading the original image irradiated by said light sources and outputting an image signal, and first storage means capable of storing at least one correction data to correct the image signal outputted from said reading means is detachably attached, comprising:

second storage means in which a plurality of correction data to correct said image signal have been stored in accordance with said light sources; and control means for selectively transferring said plurality of correction data stored in said second storage means to said first storage means according to an operation condition of said reading means.

92. An apparatus according to claim 91, wherein said second storage means stores correction data for each of said plurality of light sources.

93. An apparatus according to claim 92, further comprising amplifying means for amplifying said image signal, and wherein said second storage means stores an amplification factor of said amplifying means.

94. An apparatus according to claim 92, wherein said second storage means stores shading correction data of said image signal.

95. An apparatus according to claim 92, wherein said second storage means stores white reference data of said image signal.

96. An apparatus according to claim 92, wherein said second storage means stores black reference data of said image signal.

97. An apparatus according to claim 91, further comprising amplifying means for amplifying said image signal, and wherein said second storage means stores an amplification factor of said amplifying means.

98. An apparatus according to claim 91, wherein said second storage means stores shading correction data of said image signal.

99. An apparatus according to claim 91, wherein said second storage means stores white reference data of said image signal.

100. An apparatus according to claim 91, wherein said second storage means stores black reference data of said image signal.

101. An apparatus according to claim 80, wherein an another cartridge having output means for outputting image data is also detachable for said apparatus.

102. An apparatus according to claim 91, wherein an another cartridge having output means for outputting image data is also detachable for said apparatus.

* * * * *